United States Patent
Hebbalaguppe et al.

(10) Patent No.: US 10,429,944 B2
(45) Date of Patent: Oct. 1, 2019

(54) SYSTEM AND METHOD FOR DEEP LEARNING BASED HAND GESTURE RECOGNITION IN FIRST PERSON VIEW

(71) Applicant: Tata Consultancy Services Limited, Mumbai (IN)

(72) Inventors: Ramya Sugnana Murthy Hebbalaguppe, Gurgaon (IN); RamaKrishna Perla, Gurgaon (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 16/020,245

(22) Filed: Jun. 27, 2018

(65) Prior Publication Data
US 2019/0107894 A1    Apr. 11, 2019

(30) Foreign Application Priority Data
Oct. 7, 2017    (IN) .............................. 201721035650

(51) Int. Cl.
*G06F 3/01* (2006.01)
*G06K 9/00* (2006.01)
(Continued)

(52) U.S. Cl.
CPC .............. *G06F 3/017* (2013.01); *G06F 3/011* (2013.01); *G06K 9/00355* (2013.01);
(Continued)

(58) Field of Classification Search
CPC ..... G06F 3/011; G06F 3/017; G06K 9/00355; G06K 9/6256; G06K 9/6267; G06T 19/006
See application file for complete search history.

(56) References Cited

U.S. PATENT DOCUMENTS

| | | | |
|---|---|---|---|
| 2016/0203360 A1* | 7/2016 | Alvarez | G06K 9/00355 345/156 |
| 2016/0313801 A1* | 10/2016 | Wagner | G06F 3/017 |
| 2017/0068849 A1* | 3/2017 | Lim | G06K 9/00389 |

OTHER PUBLICATIONS

Araga et al., Real Time Gesture Recognition System Using Posture Classifier and Jordan Recurrent Neural Network, Jun. 10-15, 2012, WCCI 2012 IEEE World Congress on Computational Intelligence (Year: 2012).*

(Continued)

*Primary Examiner* — Dmitriy Bolotin
(74) *Attorney, Agent, or Firm* — Finnegan, Henderson, Farabow, Garrett & Dunner LLP

(57) ABSTRACT

This disclosure relates generally to hand-gesture recognition, and more particularly to system and method for detecting interaction of 3D dynamic hand gestures with frugal AR devices. In one embodiment, a method for hand-gesture recognition includes receiving frames of a media stream of a scene captured from a FPV of a user using RGB sensor communicably coupled to a wearable AR device. The media stream includes RGB image data associated with the frames of the scene. The scene comprises a dynamic hand gesture performed by the user. Temporal information associated with the dynamic hand gesture is estimated from the RGB image data by using a deep learning model. The estimated temporal information is associated with hand poses of the user and comprises key-points identified on user's hand in the frames. Based on said temporal information, the dynamic hand gesture is classified into predefined gesture classes by using multi-layered LSTM classification network.

13 Claims, 6 Drawing Sheets

(51) Int. Cl.
*G06K 9/62* (2006.01)
*G06T 19/00* (2011.01)

(52) U.S. Cl.
CPC ......... *G06K 9/6256* (2013.01); *G06K 9/6267* (2013.01); *G06T 19/006* (2013.01)

(56) References Cited

OTHER PUBLICATIONS

Author: Xinghao Chen, Hengkai Guo, Guijin Wang, Li Zhang Title: Motion Feature Augmented Recurrent Neural Network for Skeleton-based Dynamic Hand Gesture Recognition Journal: Computer Vision and Pattern Recognition Date: 2017 Publisher: Department of Electronic Engineering, Tsinghua University, Beijin.

Author: Pietro Morerio, Lucio Marcenaro, Carlo S. Regazzoni Title: Hand detection in First Person Vision Journal: Proceedings of the 16th International Conference on Information Fusion Date: Jul. 9-13, 2013 Publisher: IEEE.

Author: Eleni Tsironi, Pablo Barros, Cornelius Weber, Stefan Wermter Title: An analysis of Convolutional Long Short-Term Memory Recurrent Neural Networks for gesture recognition Journal: Neurocomputing Date: Dec. 13, 2017 pp. 76-86 vol. 268 Publisher: Elsevier B.V.

\* cited by examiner

SYSTEM AND METHOD FOR DEEP LEARNING BASED HAND GESTURE RECOGNITION IN FIRST PERSON VIEW

PRIORITY CLAIM

This U.S. patent application claims priority under 35 U.S.C. § 119 to: India Application No. 201721035650, filed on Oct. 7, 2017. The entire contents of the aforementioned application are incorporated herein by reference.

TECHNICAL FIELD

This disclosure relates generally to detection of hand gestures, and more particularly to a system and method for detecting interaction of three dimensional dynamic hand gestures with frugal augmented reality (AR) devices such as head-mount devices.

BACKGROUND

Wearable Augmented Reality (AR) devices have been exceedingly popular in recent years. The user interaction modalities used in such devices point to the fact that hand gestures form an intuitive means of interaction in ARNR (virtual reality) applications. These devices use a variety of on-board sensors and customized processing chips which often ties the technology to complex and expensive hardware. These devices are tailor made to perform a specific function and are mostly readily unavailable due to their exorbitant prices.

Convention generic platforms, for instance, Microsoft Kinect™ and Leap Motion™ Controller provide the much needed abstraction. The inventors here have recognized several technical problems with such conventional systems, as explained below. Such conventional platforms/device fare poorly in varying light conditions such as direct sunlight, incandescent light and outdoor environments due to the presence of infrared radiation and in the presence of reflective surfaces such as a thick glass and under water.

SUMMARY

Embodiments of the present disclosure present technological improvements as solutions to one or more of the above-mentioned technical problems recognized by the inventors in conventional systems. For example, in one embodiment, a method for hand-gesture recognition is disclosed. The method includes receiving, via one or more hardware processors, a plurality of frames of a media stream of a scene captured from a first person view (FPV) of a user using at least one RGB sensor communicably coupled to a wearable AR device. The media stream includes RGB image data associated with the plurality of frames of the scene. The scene comprises a dynamic hand gesture performed by the user. Further, the method includes estimating, via the one or more hardware processors, a temporal information associated with the dynamic hand gesture from the RGB image data by using a deep learning model. The estimated temporal information is associated with hand poses of the user and comprises a plurality of key-points identified on user's hand in the plurality of frames. Further, the method includes classifying, by using a multi-layered Long Short Term memory (LSTM) classification network, the dynamic hand gesture into at least one predefined gesture class based on the temporal information of the key points, via the one or more hardware processors.

In another embodiment, a system for gesture recognition is provided. The system includes one or more memories; and one or more hardware processors, the one or more memories coupled to the one or more hardware processors, wherein the at least one processor is capable of executing programmed instructions stored in the one or more memories to receive a plurality of frames of a media stream of a scene captured from a first person view (FPV) of a user using at least one RGB sensor communicably coupled to a wearable AR device. The media stream includes RGB image data associated with the plurality of frames of the scene. The scene includes a dynamic hand gesture performed by the user. The one or more hardware processors are further configured by the instructions to estimate a temporal information associated with the dynamic hand gesture from the RGB image data by using a deep learning model. The estimated temporal information is associated with hand poses of the user and includes a plurality of key-points identified on user's hand in the plurality of frames. Further, the one or more hardware processors are further configured by the instructions to classify, by using a multi-layered LSTM classification network, the dynamic hand gesture into at least one predefined gesture class based on the temporal information of the key points.

In yet another embodiment, a non-transitory computer-readable medium having embodied thereon a computer program for executing a method for gesture recognition is provided. The method includes receiving a plurality of frames of a media stream of a scene captured from a first person view (FPV) of a user using at least one RGB sensor communicably coupled to a wearable AR device. The media stream includes RGB image data associated with the plurality of frames of the scene. The scene comprises a dynamic hand gesture performed by the user. Further, the method includes estimating a temporal information associated with the dynamic hand gesture from the RGB image data by using a deep learning model. The estimated temporal information is associated with hand poses of the user and comprises a plurality of key-points identified on user's hand in the plurality of frames. Further, the method includes classifying, by using a multi-layered LSTM classification network, the dynamic hand gesture into at least one predefined gesture class based on the temporal information of the key points.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1A:
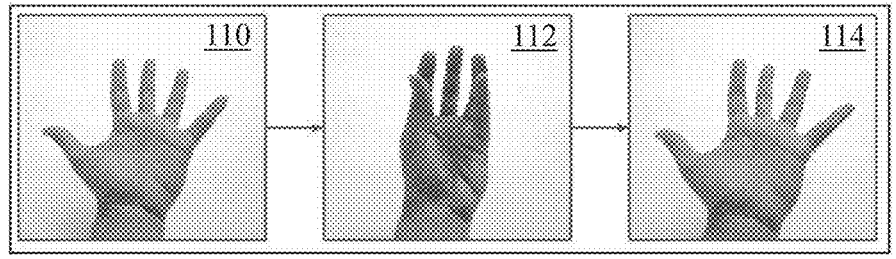
FIGS. 1A-1D illustrates various examples of dynamic hand gestures according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Augmented reality refers to representation of a view of physical, real-world environment whose elements are augmented by computer-generated sensory input such as sound, text, graphics, or video. AR is useful in various applications such as medical, education, entertainment, military, and so on. Wearable AR/VR devices such as the Microsoft Halolens™, Daqri Smart Helmet™, Meta Glasses™ have been exceedingly popular in recent years.

The user interaction modalities used in such devices point to the fact that hand gestures form an intuitive means of interaction in AR/VR applications. These devices use a variety of on-board sensors and customized processing chips which often ties the technology to complex and expensive hardware. These devices are tailor made to perform a specific function and are not readily available due to their exorbitant prices. Generic platforms such as the Microsoft Kinect™ and Leap Motion™ Controller provide the much needed abstraction but fare poorly in direct sunlight, incandescent light and outdoor environments due to the presence of infrared radiation and in the presence of reflective surfaces such as a thick glass and under water.

Currently due to advances in powerful processors and high-quality optics in smart mobile electronic devices, such devices have been gaining popularity as appealing and readily available platform for AR/VR applications. For instance, devices such as Google Cardboard™ and Wearality which are video-see-through devices for providing an immersive VR experience.

Using a stereo-rendered camera feed and overlaid images, audio and text, these devices can also be extended for AR applications. The main motive of using these frugal headsets (Google Cardboard or Wearality with an Android smartphone) was their economic viability, portability and easy scalability to the mass market. However, accessibility of sensors to these head mounted devices (HMDs) is limited to the sensors available on the attached smartphone. Current versions use a magnetic trigger or a conductive lever to trigger a single event hence curtailing the richness of possible user interaction.

In addition, frequent usage of magnetic trigger and conductive lever leads to wear and tear of the device. Moreover, head tracking in said devices is inconvenient and shifts the focus away from object of interest in user Field of View (FoV). Moreover, such devices offer inaccurate speech recognition in industrial outdoor setting due to ambient noise, Based on the above mentioned technical problems in the conventional devices, hand gestures are typically the preferred mode of interaction as they reduce human-effort and are effective in interacting with the surrounding environment. However, current methods for hand gesture recognition in First Person View (FPV) are constrained to specific use-cases and lacks robustness under realistic conditions because of skin color dependency.

Various embodiments disclosed herein provides methods and system provide technical solution to the above mentioned technical problems in gesture detection, particularly dynamic hand gesture detection, using deep learning approach. By using deep learning approach, computer vision models can be built that are robust to intra class variations and often surpass human abilities in performing detection and classification tasks. In an embodiment, a system for detecting and classifying complex hand gestures, such as Bloom, Click, Zoom-In, Zoom-Out in FPV for AR applications involving single RGB camera input with-out having built-in depth sensors, is presented. The aforementioned hand gestures are presented in FIGS. 1A-1D for the ease of understanding. By using the deep learning approach for hand gesture detection, the disclosed method and system overcomes the limitations with existing techniques and opens avenues for rich user-interaction on frugal devices.

Figure 1B:
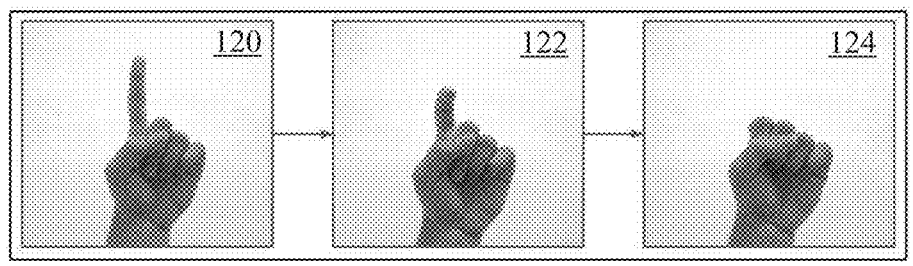
Figure 1C:
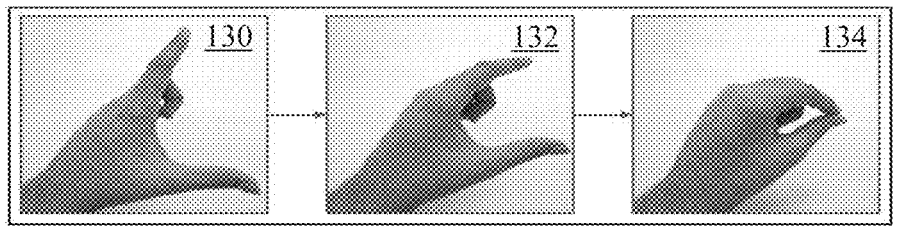
Figure 1D:
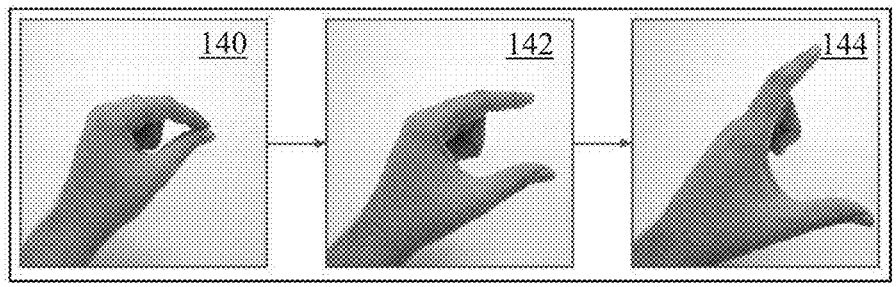

Referring now to FIGS. 1A-1D, various dynamic hand gestures are illustrated. For example, FIG. 1A illustrates a 'Bloom' dynamic hand gesture, FIG. 1B illustrates various stages of a 'click' dynamic hand gesture, FIG. 1C illustrates various stages of 'Zoom-in' dynamic hand gesture, and FIG. 1D illustrates various stages of 'Zoom-Out' dynamic hand gesture. Herein, the term 'dynamic' 3D hand gesture refers to a hand gesture which is not static but required dynamic motion. In accordance the dynamic hand gestures considered herein such as Bloom, Click, Zoom-in, and Zoom-out are each shown to include multiple stages. For instance, the hand-gesture bloom illustrated in FIG. 1A is performed by following stages 110 followed by stage 112, which is further followed by stage 114. The bloom hand gesture can be performed for performing a predefined task, for example, a menu display operation. Similarly, FIG. 1B illustrates multiple stages of hand movement to execute/perform click hand gesture, including stage 120 followed by stage 122, which is further followed by stage 124. The click hand gesture can be performed for performing a predefined task, such as a select/hold operation. Also, FIG. 1C illustrates multiple stages of hand movement to execute Zoom-in hand gesture, including stage 130 followed by stage 132, which is further followed by stage 134, The Zoom-in hand gesture can be performed zooming into a display, for example that of a scene. The execution/performance of hand gesture Zoom-out is shown in FIG. 1D, wherein stage 140 of hand movement is followed by hand movement in stage 142 which is finally followed by stage 144. The zoom-out hand gesture can be performed, for instance for performing a predefined task such as zooming-out of a scene being displayed.

Herein, it will be noted that the aforementioned hand gestures are presented for exemplary purposes and are not intended to limit the embodiments disclosed herein. Various distinct applications and devices can utilize distinct hand gestures to perform various functionalities by utilizing the computations described herewith in various embodiments. Moreover, herein the dynamic hand gesture may correspond to one of a 2D hand gesture and a 3D hand gesture.

The embodiments disclosed herein presents method and system for detecting complex dynamic hand gestures such as those described and depicted in FIGS. 1A-1D in First Person View (FPV) for AR applications involving single RGB camera. The system uses RGB image data received from the single RGB camera as the input, without requiring any depth information, thereby precluding the need of additional sophisticated depth sensors and overcoming the limitations of existing techniques. A high level example system architecture for gesture detection in accordance with various embodiments of the present disclosure is presented here with reference to FIG. 2.

The methods and systems are not limited to the specific embodiments described herein. In addition, the method and system can be practiced independently and separately from other modules and methods described herein. Each device element/module and method can be used in combination with other elements/modules and other methods.

The manner, in which the system and method for region of interest (ROI) marking using head-mount devices shall be implemented, has been explained in details with respect to the FIGS. 1 through 5. While aspects of described methods and systems for ROI marking using head-mount devices can be implemented in any number of different systems, utility environments, and/or configurations, the embodiments are described in the context of the following exemplary system (s).

Figure 2:
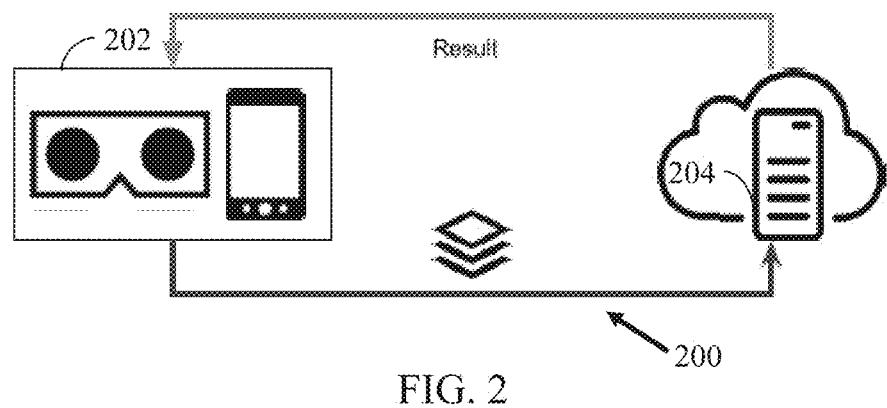
FIG. 2 illustrates an example system architecture for gesture recognition using deep learning according to some embodiments of the present disclosure.

Referring now to FIG. 2, example system architecture 200 for gesture detection using deep learning is described in accordance with various embodiments of present disclosure. The system architecture is shown to include a device for capturing a media stream in FPV of a user. In a simple form, the disclosed device 202 may include a (1) single RGB camera, for example, installed in a mobile communication device such as a smart phone, and (2) an AR wearable for example a head mounted AR device. Example of such an AR wearable may include Google cardboard. The media stream captured by the RGB camera in user's FPV (being facilitated by the AR wearable) is sent to a system 204 for gesture detection. In an embodiment, the system may be embodied in a remote server. In an embodiment, the media stream may be downscaled prior to sending the same to the remote server. The system 204 is adapted to classify the performed gesture in the media stream in order to recognize the gesture. Upon recognition of the gesture, the system 204 communicates the result back to the mobile communication device.

Figure 3:
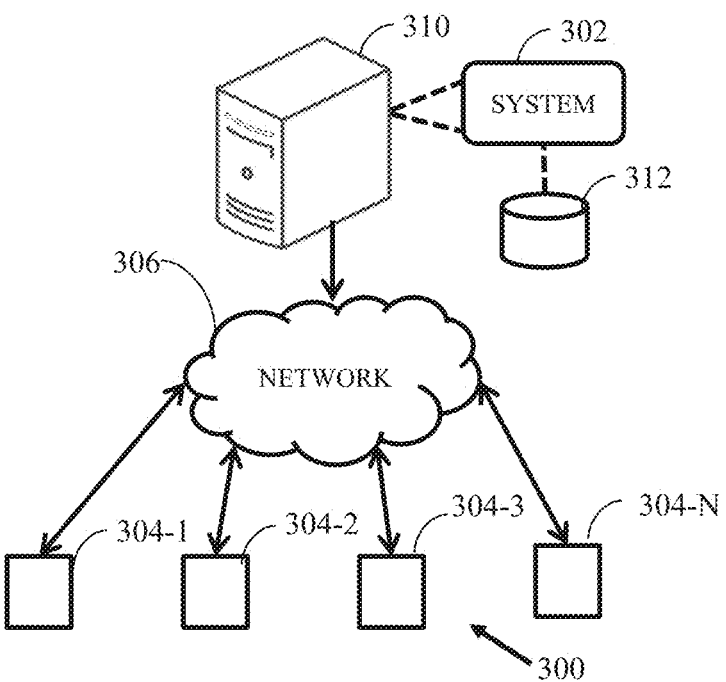
FIG. 3 illustrates a network implementation of system for gesture recognition using deep learning according to some embodiments of the present disclosure.

Referring now to FIG. 3, a network implementation 300 of system 302 for gesture detection is illustrated, in accordance with an embodiment of the present subject matter. The system is adapted to receive a media stream having a dynamic hand gesture being performed for executing a predefined task, wherein the media stream is captured in user's FPV. Various hand gestures and the corresponding predefined tasks have been described with reference to FIGS. 1A-1D, The system 302 is capable of detecting the dynamic hand gesture. In an example embodiment, the detection of dynamic hand gesture includes detecting a presence of a stable hand in a hand pose, followed by motion of hand in particular manner so as to execute the predefined task.

Although the present subject matter is explained considering that the system 302 is implemented for gesture detection via head-mount devices, it may be understood that the system 302 may is not restricted to any particular machine or environment. The system 302 can be utilized for a variety of domains where detection of gesture for execution of a task is to be determined. The system 302 may be implemented in a variety of computing systems, such as a laptop computer, a desktop computer, a notebook, a workstation, a mainframe computer, a server, a network server, and the like.

Herein, the system 302 may capture the media stream, for example, videos and/or images via multiple devices and/or machines 304-1, 304-2 . . . 304-N, collectively referred to as devices 304 hereinafter. Each of the devices includes least one RGB sensor communicably coupled to a wearable AR device. The RGB sensors may be embodied in media capturing device having such as a handheld electronic device, a mobile phone, a smartphone, a portable computer, a PDA, and so on. In an embodiment, the device may embody a VR camera in addition to the RGB sensor. Alternatively, the device embodying the RGB sensor may be communicably coupled to a wearable AR device to allow capturing of the media stream in a FPV of a user holding the media capturing device and wearing the wearable AR device. Herein, the AR devices are the devices that may embody AR technologies. AR technologies enhance user's perception and help the user to see, hear, and feel the environments in enriched ways. The devices 304 are communicatively coupled to the system 302 through a network 306, and may be capable of transmitting the captured media stream to the system 302.

In one implementation, the network 306 may be a wireless network, a wired network or a combination thereof. The network 306 can be implemented as one of the different types of networks, such as intranet, local area network (LAN), wide area network (WAN), the internet, and the like. The network 306 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 306 may include a variety of network devices, including routers, bridges, servers, computing devices, storage devices, and the like.

In an embodiment, the system 302 may be embodied in a computing device 310. Examples of the computing device 310 may include, but are not limited to, a desktop personal computer (PC), a notebook, a laptop, a portable computer, a smart phone, a tablet, and the like. The system 302 may also be associated with a data repository 312 to store the media stream. Additionally or alternatively, the data repository 312 may be configured to store data and/or information generated during gesture recognition in the media stream. The repository 312 may be configured outside and communicably coupled to the computing device 310 embodying the system 302. Alternatively, the data repository 312 may be configured within the system 302. An example implementation of the system 302 for gesture recognition in the media stream is described further with reference to FIG. 4.

Figure 4:
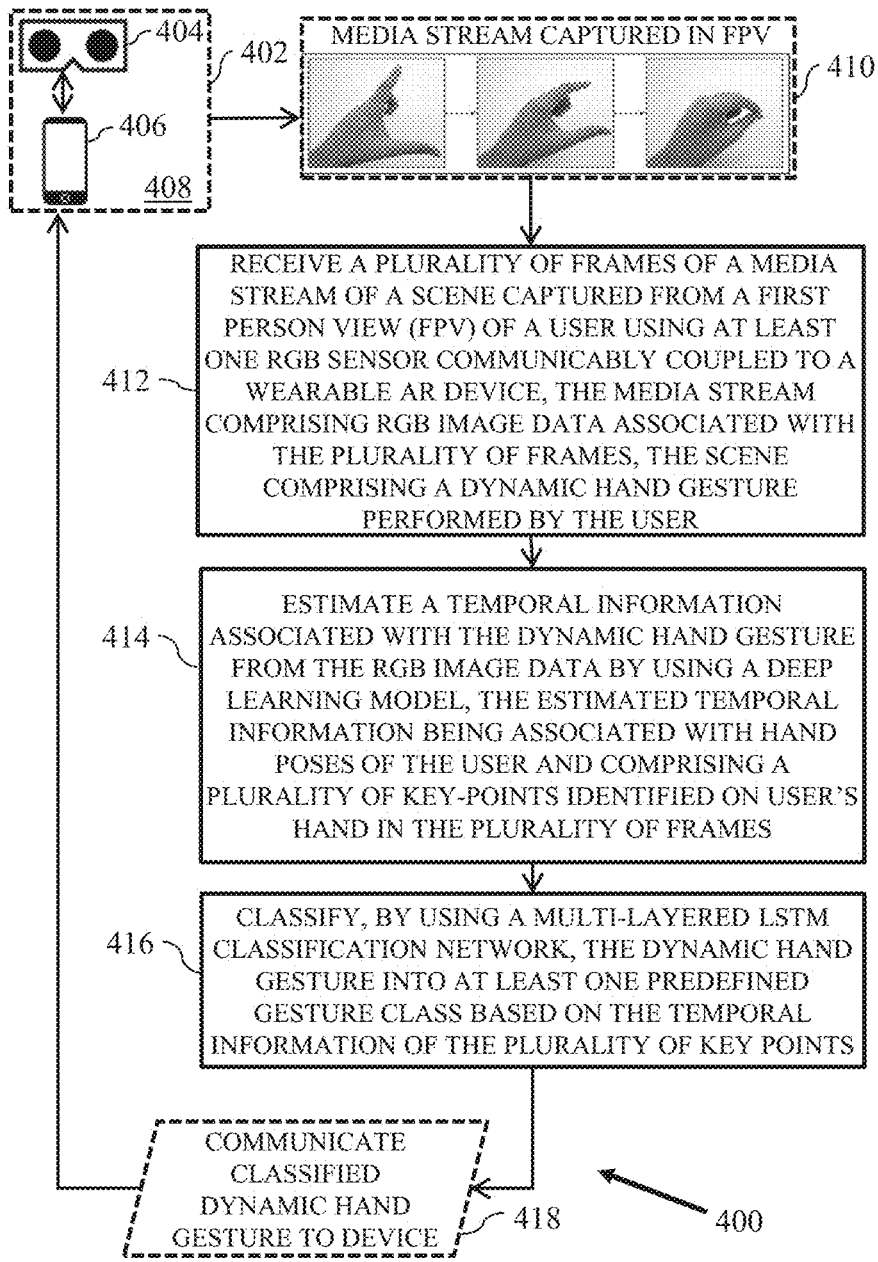
FIG. 4 illustrates a representative process flow for gesture recognition using deep learning according to some embodiments of the present disclosure.

FIG. 4 illustrates a flow diagram of a method 400 for hand-gesture recognition, according to some embodiments of the present disclosure. The method 400 may be described in the general context of computer executable instructions. Generally, computer executable instructions can include routines, programs, objects, components, data structures, procedures, modules, functions, etc., that perform particular functions or implement particular abstract data types. The method 400 may also be practiced in a distributed computing environment where functions are performed by remote processing devices that are linked through a communication network. The order in which the method 400 is described is not intended to be construed as a limitation, and any number of the described method blocks can be combined in any order to implement the method 400, or an alternative method. Furthermore, the method 200 can be implemented in any suitable hardware, software, firmware, or combination thereof. In an embodiment, the method 400 depicted in the flow chart may be executed by a system, for example, the system 302 of FIG. 3. In an example embodiment, the system 302 may be embodied in an exemplary computer system, for example computer system 801 (FIG. 7). The method 400 of FIG. 4 will be explained in more detail below with reference to FIGS. 4-7.

Referring to FIG. 4, in the illustrated embodiment, the method 400 is initiated when at 402, a user captures a media stream by means of a RGB sensor communicably coupled to a wearable AR device 404. Examples of a device 406 embodying the RGB sensor may include, but is not limited to a smartphone, a PDA, a portable computer and so on. The wearable AR device 404 may include hardware and software that may be collectively configured to host an AR application for performing AR related functions. For the brevity of description, the device 406 incorporating the RGB sensor along with the device running the AR application (or the wearable AR device 404) may hereinafter be collectively referred to as a device 408. The device 408 captures a media stream of dynamic gestures, for example, gestures as described in FIGS. 1A-1D, performed by the user in the FPV. In an embodiment, the gesture may include a dynamic hand gesture. In an embodiment, the dynamic hand gesture may be one of a 2D and 3D hand gesture. The frames of the media stream captured in FPV are streamed for processing to the gesture recognition system (for example, the system 302 of FIG. 3), at 410. In an implementation, the frames obtained from the device 408 are first down-scaled, for example to a resolution of, for example, 320×240, to achieve real-time performance by reducing the computational time without compromising on quality. In an embodiment, the device 408 streams the frames to the gesture recognition system, for example at 25 FPS.

At 412, the gesture recognition system receives a plurality of frames of the media stream. The frames are the RGB frames acquired from the device 408. The RGB frames include RGB image data associated with the plurality of frames of the scene. Herein, the RGB image data refers to data corresponding Red, Green and Blue colors associated with the frames.

At 414, a temporal information associated with the dynamic hand gesture is estimated from the RGB image data by using a deep learning model. In an embodiment, the gesture recognition system estimated the temporal information associated with the dynamic hand gesture. The estimated temporal information is associated with hand poses of the user and includes a plurality of key-points identified on user's hand in the plurality of frames. Various hand poses (or stages of dynamic hand gestures) of a user while performing the dynamic hand gestures are described with reference to FIGS. 1A-1D. A detailed explanation of estimation of the temporal information is described further with reference to FIG. 5.

Figure 5:
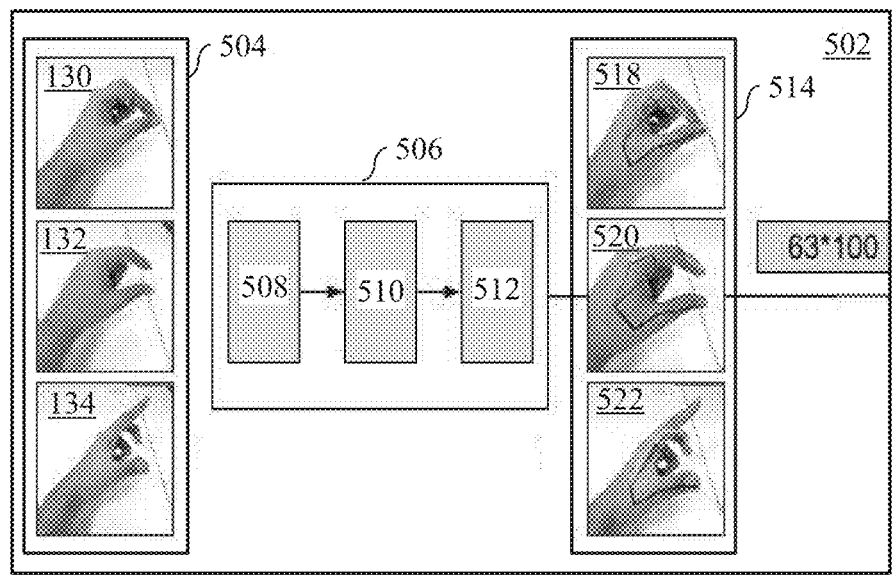
FIG. 5 illustrates a process flow for estimating temporal information associated with the dynamic hand gesture according to some embodiments of the present disclosure.

Referring to FIG. 5, a process flow for estimating temporal information associated with the dynamic hand gesture is illustrated. Herein, the estimation of the temporal information is performed by a hand pose estimation module 502. The hand pose estimation module 502 facilitates in estimating the temporal information is based on a deep learning approach that estimates 3D hand pose from a single RGB image, thereby overcoming the challenges caused due to unavailability of depth information in conventional systems. In an embodiment, a deep learning network utilized RGB image data to estimate the temporal information. As described earlier, the temporal information includes a plurality of key-points on hand present in the user's field of view (FoV) in the frames. In an embodiment, the plurality of key-points includes 21 hand key-points comprises 4 key points per finger and one key-point close to wrist of the user's hand. The gesture recognition system detects the plurality of key-points and learns/estimates a plurality of network-implicit 3D articulation prior having the plurality of key points of sample user's hands from sample RGB images using the deep learning network. The plurality of network-implicit 3D articulation priors includes a plurality of key-points determined from a plurality of training sample RGB images of user's hand. Based on the plurality of network-implicit 3D articulation priors, the hand pose estimation module 502 detects the plurality of key-points on the user's hand in the plurality of frames (or RGB images), A detailed process flow for detecting the key-points on the user's hand in the RGB images is illustrated in FIG. 5. For example, the RGB images such as images 130, 132, 134 are received at the gesture recognition system at 502. The gesture recognition system may include the hand pose estimation module 502 for estimating temporal information associated with the gesture dynamic hand gesture. The hand pose estimation module 502 estimates the temporal information with the help of deep learning networks including, but not limited to HandSegNet network, PoseNet network and PosePrior network, as described below:

HandSegNet network (marked as 508): The HandSegNet network is a segmentation network to localize hand within the image/frame.

PoseNet (marked as 510): Given segmented hand mask as the input, the PoseNet localizes 21 hand key-points by estimating 2-dimensional scoremaps for each key-point, containing likelihood information about its spatial location.

PosePrior (marked as 512): PosePrior network estimates the most likely 3D hand structure conditioned on the score maps obtained from PoseNet.

In an example embodiment, the aforementioned deep learning networks may be pre-trained in order to estimate the plurality of key-points. For example, in an embodiment, the plurality of key-points may include 21 key-points of user's hand. These networks may be trained using a large-scale 3D hand pose dataset having a plurality of training samples RGB images based on synthetic hand models. The dataset may include a huge data set of photo-realistic renderings of different subjects performing multiple unique actions. For building the dataset, videos of all the user's hands present in the dataset may be lie in an optimum range, for example 40 cm to 65 cm from the camera center which is ideal for FPV use-cases. The light position and intensities may be randomized and the images may be saved using a lossy JPEG compression with losses of up to 40%. The background may be selected chosen at random from various images and the camera location may be chosen randomly in spherical vicinity around the hand for each frame ensuring the robustness of the model to external factors. As described, using the deep learning networks, the hand pose estimation module 502 detects the plurality of key-points on the user's hand in the plurality of frames based on the plurality of network-implicit 3D articulation priors. The 21 key-points detected by the network are shown as an overlay at 514 on the input video frames 516 (for example, video frames 518, 520, 522) in FIG. 5.

The hand pose estimation module outputs coordinate values for each of the 21 key-points (also referred to as temporal information) detected on the user's hand. The temporal information is input to a gesture classification network. The gesture classification network includes an LSTM network. The LSTM network classifies the dynamic hand gesture into at least one predefined gesture class based on the key-points, as is explained further with reference to FIGS. 4 and 6.

Referring back to FIG. 4 again, at 416, the dynamic gesture is classified into at least one predefined gesture class based on the temporal information of the key points by using a multi-layered LSTM classification network. In an embodiment, the multi-layered LSTM network includes a first layer, a second layer and a third layer. The first layer includes a LSTM layer consisting of a plurality of LSTM cells to learn long-term dependencies and patterns in 3D coordinates sequence of 21 key-points detected on the user's hand. The second layer includes a flattening layer that makes the temporal data one-dimensional, and the third layer includes a fully connected layer with output scores that correspond to each of the 3D dynamic hand gestures. The output scores are indicative of posterior probability corresponding to the each of the dynamic hand gestures for classification in the at least one predefined gesture class. For example, in the present embodiment if the system is trained for classification of dynamic hand gestures into four classes (for instance, the dynamic hand gestures defined in FIGS. 1A to 1D), then there would be four output scores determined by the third layer. In alternate embodiments, the number of output scores can vary depending on the number of the gestures classes. Herein, it will be noted that the ability and efficiency of LSTM neural networks in learning long-term dependencies of sequential data facilitates the LSTM network based architecture for the task of gesture classification using spatial location of hand key-points in video frames. An important contribution of the disclosed embodiments towards dynamic gesture recognition is that in disclosed embodiments, inputting only 3D coordinate values of the hand pose in modeling the key-points' variation across frames helps in achieving real-time performance of the framework by reducing computational cost. An example of classification of dynamic gesture into at least one predefined class is described with reference to FIG. 6.

Figure 6:
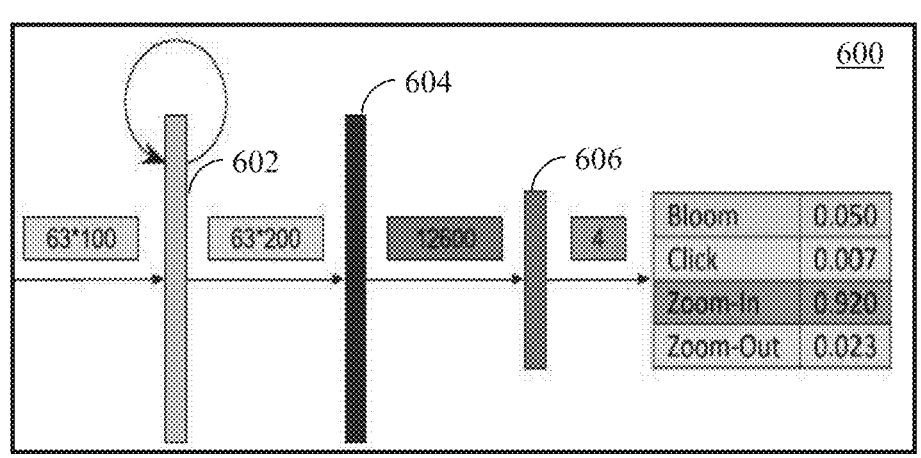
FIG. 6 illustrates an example multi-layer LSTM network for gesture classification according to some embodiments of the present disclosure.
Figure 7:
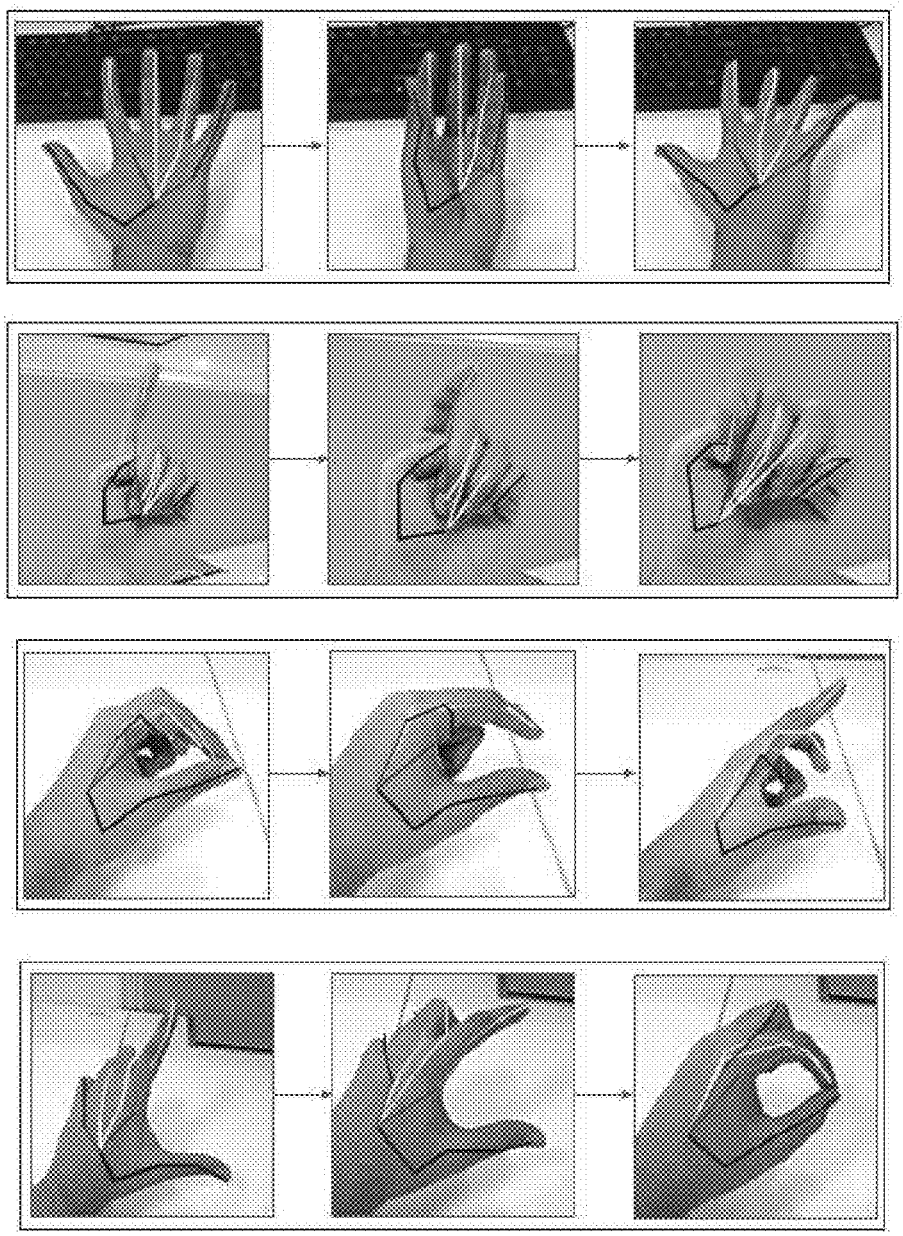
FIG. 7 illustrates a plurality of key-points detected by hand pose detection module as overlay on input images according to some embodiments of the present disclosure.

Referring now to FIG. 6, an example multi-layer LSTM network 600 for gesture classification task denoting output shape after every layer, is described. The LSTM network 600 is shown to include three layers, namely, a first layer 602 including a LSTM layer, a second layer 604 including a flattening layer, and a third layer 606 including a fully connected layer. Each gesture input is sampled into 100 frames spread evenly across the duration for feeding into the LSTM network 600, making the input of size 63×100 (3 coordinate values for each of the 21 key-points) to the LSTM layer 602, as illustrated in FIG. 6. The LSTM layer 602 consisting of 200 LSTM cells tries to learn long-term dependencies and patterns in the sequence of coordinates during network training. The LSTM layer 602 is followed by the flattening layer 604 that makes the data one-dimensional. The flattening layer 604 is then followed by the fully connected layer 606 with 4 output scores that correspond to each of the 4 gestures.

In an embodiment, the LSTM model may be trained for classifying the dynamic hand gesture from amongst the plurality of dynamic hand gestures by using a softmax activation function. The gesture classification module interprets, by using a softmax activation function, output scores as un-normalized log probabilities and squashing the output scores to be between 0 and 1 using the following equation:

$$\sigma(s)_j = \frac{e^{s_j}}{\sum_{k=0}^{K-1} e^{s_k}}$$

where, K denotes number of classes, s is a K×1 vector of scores, an input to softmax function, and j is an index varying from 0 to K−1, and σ(s) is K×1 output vector denoting the posterior probabilities associated with each gesture;

In an embodiment, the LSTM network is trained for classifying the dynamic gesture into one of the gesture class. In an embodiment, training the LSTM network includes computing cross-entropy loss Li of $i^{th}$ training sample of the batch by using following equation:

$$L_i = -h_j * \log(\sigma(s)_j)$$

where h is a 1×K vector denoting one-hot label of the input; and

Further, a mean of Li is computed over training examples of the batch and is propagated back in the LSTM network to fine tune the LSTM model in training.

Referring back to FIG. 4, upon classifying the dynamic gesture into the at least one predefined gesture class at 416, the gesture recognition system communicates the classified at least one predefined gesture class to the device 408, thereby enabling the device 408 to trigger a pre-defined task in the AR application.

An example scenario illustrating the gesture classification based on disclosed embodiments is described further in description.

Example Scenario:

The embodiments herein utilize a data set of Bloom, Click, Zoom-In, Zoom-Out dynamic hand gestures captured in egocentric view. The data set includes 480 videos which include 100 videos per gesture in train set and 20 video per gesture in test set. The data videos in the dataset are high quality videos are captured at a resolution of 320×240, and at 30 FPS. Six users with varying skin colors were involved in the data collection, in the ages ranging from 21 to 55. The videos were recorded in different places (outdoor, indoor, living room, office setting, cafeteria) in order to gather maximum variation in color composition, lighting conditions, and dynamic background scenes. Each gesture lasted for an average of 4:1 seconds; the most complex bloom taking the average of 5 seconds and the simpler zoom gestures taking an average of 3:5 seconds.

The hand pose detection module (described with reference to FIG. 4) is utilized for estimating the hand pose by detecting 21 key-points of hand. The key points detected by the hand pose detection module are shown in FIG. 7.

As illustrated in FIG. 7, the 21 key-points detected by the hand pose detection module are shown as an overlay on the input images while testing the gesture recognition system. The 3D coordinate values of these 21 key-points are then fed to the LSTM network for gesture classification.

The gesture recognition system utilizes the dataset of 420 videos for training and testing the LSTM classification network. While training, each of the 400 videos from the train set is sampled into 100 frames spread evenly across the duration for feeding into the LSTM network. With a batch size of 5 and a validation split of 70:30, the LSTM network is trained for 300 epochs taking around 11 hours on the GPU set-up. An accuracy of 91% is achieved on the validation split while training the network. Further, the model is tested on a test set of 80 videos. Table 1 shows a confusion matrix for the experiments. An accuracy of 87:5% with 9 cases of misclassification out of 80. The presence of a dynamic hand gesture is detected when the probability of a dynamic hand gesture is more than 85% using the following equation:

$$\max_{0<j<3} \sigma(s)_i \geq 0.85 \quad (3)$$

where $\sigma(s)_i$ is the predicted probability for the ith class. The recognized dynamic hand gesture is communicated to the smartphone. Otherwise, no gesture-detection is reported. Table 1 below illustrates Confusion matrix for the gesture recognition system yielding an accuracy of 87:5% with 9 cases of mis-classification out of 80

| True Gesture | Predicted Gesture | | | | |
|---|---|---|---|---|---|
| | Bloom | Click | Zoom In | Zoom Out | Unclassified |
| Bloom | 19 | 0 | 0 | 1 | 0 |
| Click | 0 | 16 | 0 | 4 | 0 |
| Zoom-In | 1 | 0 | 18 | 0 | 1 |
| Zoom-Out | 0 | 3 | 0 | 17 | 0 |

Figure 8:
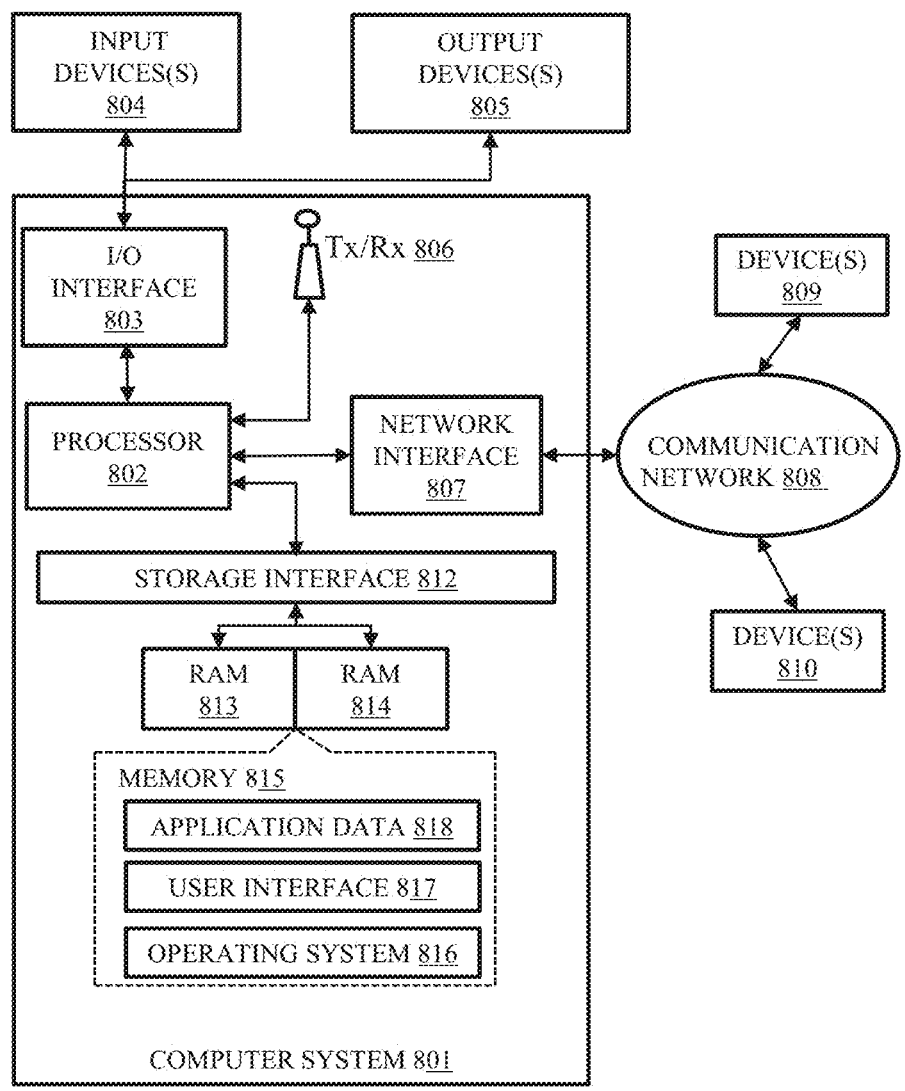
FIG. 8 is a block diagram of an exemplary computer system for implementing embodiments consistent with the present disclosure.

The disclosed LS™-only architecture is capable of delivering frame rates of up to 107 on GPU implementation. However, the hand pose estimation network works at 9 FPS. To ensure maximum throughput of the combined framework, the hand pose estimation network is allowed to drop frames; the latest frame received at the server is fed to the network. The 3D coordinate values are interpolated before feeding them to the LSTM network to get 100 data-points. This enables the framework to dynamically adapt to GPU performance, hence minimizing the recognition time after completion the gesture. As a result, the average response time of the proposed framework is found to be 0:8 s on the GPU configuration. A block diagram of an exemplary computer system 801 for implementing embodiments FIG. 8 is a block diagram of an exemplary computer system 801 for implementing embodiments consistent with the present disclosure. The computer system 801 may be implemented in alone or in combination of components of the system 302 (FIG. 3). Variations of computer system 801 may be used for implementing the devices included in this disclosure. Computer system 801 may comprise a central processing unit ("CPU" or "hardware processor") 802. The hardware processor 802 may comprise at least one data processor for executing program components for executing user- or system-generated requests. The processor may include specialized processing units such as integrated system (bus) controllers, memory management control units, floating point units, graphics processing units, digital signal processing units, etc. The processor may include a microprocessor, such as AMD Athlon™, Duron™ or Opteron™, ARM's application, embedded or secure processors, IBM PowerPC™, Intel's Core, Itanium™, Xeon™, Celeron™ or other line of processors, etc. The processor 802 may be implemented using mainframe, distributed processor, multicore, parallel, grid, or other architectures. Some embodiments may utilize embedded technologies like application specific integrated circuits (ASICs), digital signal processors (DSPs), Field Programmable Gate Arrays (FPGAs), etc.

Processor 802 may be disposed in communication with one or more input/output (I/O) devices via I/O interface 803. The I/O interface 803 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 803, the computer system 801 may communicate with one or more I/O devices. For example, the input device 804 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc.

Output device 805 may be a printer, fax machine, video display (e.g., cathode ray tube (CRT), liquid crystal display (LCD), light-emitting diode (LED), plasma, or the like), audio speaker, etc. In some embodiments, a transceiver 806 may be disposed in connection with the processor 802. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 802 may be disposed in communication with a communication network 808 via a network interface 807. The network interface 807 may communicate with the communication network 808. The network interface may employ connection protocols including, without limitation, direct connect, Ethernet (e.g., twisted pair 10/100/1000 Base T), transmission control protocol/Internet protocol (TCP/IP), token ring, IEEE 802.11a/b/g/n/x, etc. The communication network 808 may include, without limitation, a direct interconnection, local area network (LAN), wide area network (WAN), wireless network (e.g., using Wireless Application Protocol), the Internet, etc. Using the network interface 807 and the communication network 808, the computer system 801 may communicate with devices 809 and 810. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 801 may itself embody one or more of these devices.

In some embodiments, the processor 802 may be disposed in communication with one or more memory devices (e.g., RAM 713, ROM 714, etc.) via a storage interface 812. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, any databases utilized in this disclosure.

The memory devices may store a collection of program or database components, including, without limitation, an operating system 816, user interface application 817, user/application data 818 (e.g., any data variables or data records discussed in this disclosure), etc. The operating system 816 may facilitate resource management and operation of the computer system 801. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 817 may facilitate display, execution, interaction, manipulation, or operation of program components through textual or graphical facilities. For example, user interfaces may provide computer interaction interface elements on a display system operatively connected to the computer system 801, such as cursors, icons, check boxes, menus, strollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, computer system 801 may store user/application data 818, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of any computer or database component may be combined, consolidated, or distributed in any working combination.

Additionally, in some embodiments, the server, messaging and instructions transmitted or received may emanate from hardware, including operating system, and program code (i.e., application code) residing in a cloud implementation. Further, it should be noted that one or more of the systems and methods provided herein may be suitable for cloud-based implementation. For example, in some embodiments, some or all of the data used in the disclosed methods may be sourced from or stored on any cloud computing platform.

Various embodiments disclose marker-less dynamic hand gesture recognition method and system for gesture recognition in ego-centric videos using deep learning approach. The disclosed system works with RGB image data only, thereby precluding need of depth information. This can enable wider reach of frugal devices for AR applications. The LSTM network is capable of recognizing 4 intuitive hand gestures (Bloom, Click, Zoom-in and Zoom-out) in real-time and has the potential to be extended for more complex recognition tasks by fine tuning the models using more realistic hand gesture data. The disclose system is capable of reducing turn-around-time and enhancing accuracy of gesture recognition, as described with reference to example scenario.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method for hand-gesture recognition, the method comprising:
receiving, via one or more hardware processors, a plurality of frames of a media stream of a scene captured from a first person view (FPV) of a user using at least one RGB sensor communicably coupled to a wearable Augmented reality (AR) device, the media stream comprising RGB image data associated with the plurality of frames of the scene, the scene comprising a dynamic hand gesture performed by the user;

estimating, via the one or more hardware processors, a temporal information associated with the dynamic hand gesture from the RGB image data by using a deep learning model, the estimated temporal information being associated with hand poses of the user and comprising a plurality of key-points identified on user's hand in the plurality of frames, wherein the plurality of key-points comprises twenty one hand key-points, and wherein each key-point of the twenty one key points comprises four key points per finger and one key-point close to wrist of the user's hand, and wherein estimating the temporal information associated with the dynamic hand gesture comprises:
  estimating, a plurality of network-implicit 3D articulation priors using the deep learning model, the plurality of network-implicit 3D articulation priors comprising a plurality of key-points determined from a plurality of training sample RGB images of user's hand; and
  detecting, based on the plurality of network-implicit 3D articulation priors, the plurality of key-points on the user's hand in the plurality of frames; and
classifying, by using a multi-layered Long Short Term memory (LSTM) classification network, the dynamic hand gesture into at least one predefined gesture class based on the temporal information associated with the plurality of key points, via the one or more hardware processors.

2. The method of claim 1, further comprising downscaling the plurality of frames upon capturing the media stream.

3. The method of claim 1, wherein the multi-layered LSTM classification network comprises:
  a first layer comprising a LSTM layer consisting of a plurality of LSTM cells to learn long-term dependencies and patterns in a 3D coordinates sequence of the plurality of key-points detected on the user's hand;
  a second layer comprising a flattening layer that makes the temporal data one-dimensional; and
  a third layer comprising a fully connected layer with output scores corresponding to each of the dynamic hand gestures, the output scores indicative of posterior probability corresponding to the each of the dynamic hand gestures for classification in the at least one predefined gesture class.

4. The method of claim 3, further comprising testing the LSTM classification network for classifying the dynamic hand gesture from amongst the plurality of dynamic hand gestures, wherein testing the LSTM classification network comprises:
  interpreting, by using a softmax activation function, output scores as unnormalized log probabilities and squashing the output scores to be between 0 and 1 using the following equation:

$$\sigma(s)_j = \frac{e^{s_j}}{\sum_{k=0}^{K-1} e^{s_k}}$$

where, K denotes number of classes, s is a K×1 vector of scores, an input to softmax function, and
  j is an index varying from 0 to K−1, and
  σ(s) is K×1 output vector denoting the posterior probabilities associated with each of the plurality of dynamic hand gestures.

5. The method of claim 3, further comprising training the LSTM classification network, wherein training the LSTM classification network comprises:
  computing cross-entropy loss Li of ith training sample of the plurality of training sample RGB images by using following equation:

$$L_i = -h_j * \log(\sigma(s)_j)$$

where h is a 1×K vector denoting one-hot label of input comprising the plurality of training sample RGB images; and
  computing a mean of $L_i$ over the plurality of training sample images and propagating back in the LSTM classification network to fine tune the LSTM classification network in the training.

6. The method of claim 1, wherein upon classifying the 3D dynamic hand gesture into the at least one predefined gesture class, communicating the classified at least one predefined gesture class to a at least one of a device embodying the at least one RGB sensor and the wearable AR device, and enabling the device to trigger a pre-defined task.

7. A system for hand-gesture recognition, the system comprising:
  one or more memories; and
  one or more hardware processors, the one or more memories coupled to the one or more hardware processors, wherein the one or more hardware processors are capable of executing programmed instructions stored in the one or more memories to:
    receive a plurality of frames of a media stream of a scene captured from a first person view (FPV) of a user using at least one RGB sensor communicably coupled to a wearable AR device, the media stream comprising RGB image data associated with the plurality of frames of the scene, the scene comprising a dynamic hand gesture performed by the user;
    estimate a temporal information associated with the dynamic hand gesture from the RGB image data by using a deep learning model, the estimated temporal information being associated with hand poses of the user and comprising a plurality of key-points identified on user's hand in the plurality of frames; wherein the plurality of key-points comprises twenty one hand key-points, and wherein each key-point of the twenty one key points comprises four key points per finger and one key-point close to wrist of the user's hand, and wherein estimating the temporal information associated with the dynamic hand gesture comprises:
      estimating, a plurality of network-implicit 3D articulation priors using the deep learning model, the plurality of network-implicit 3D articulation priors comprising a plurality of key-points determined from a plurality of training sample RGB images of user's hand; and
      detecting, based on the plurality of network-implicit 3D articulation priors, the plurality of key-points on the user's hand in the plurality of frames; and
    classify, by using a multi-layered LSTM classification network, the dynamic hand gesture into at least one predefined gesture class based on the temporal information associated with the plurality of key points.

8. The system of claim 7, wherein the one or more hardware processors are further configured by the instructions to downscale the plurality of frames upon capturing the media stream.

9. The system of claim 8, wherein the multi-layered LSTM classification network comprises:
a first layer comprising a LSTM layer consisting of a plurality of LSTM cells to learn long-term dependencies and patterns in a 3D coordinates sequence of the plurality of key-points detected on the user's hand;
a second layer comprising a flattening layer that makes the temporal data one-dimensional; and
a third layer comprising a fully connected layer with output scores corresponding to each of the dynamic hand gestures, the output scores indicative of posterior probability corresponding to the each of the dynamic hand gestures for classification in the at least one predefined gesture class.

10. The system of claim 9, wherein the one or more hardware processors are further configured by the instructions to test the LSTM classification network for classifying the dynamic hand gesture from amongst the plurality of dynamic hand gestures, wherein to test the LSTM classification network, the one or more hardware processors are further configured by the instructions to:
interpret, by using a softmax activation function, output scores as unnormalized log probabilities and squashing the output scores to be between 0 and 1 using the following equation:

$$\sigma(s)_j = \frac{e^{s_j}}{\sum_{k=0}^{K-1} e^{s_k}}$$

where,
K denotes number of classes, s is a K×1 vector of scores, an input to softmax function, and
j is an index varying from 0 to K−1, and
σ(s) is K×1 output vector denoting the posterior probabilities associated with each of the plurality of dynamic hand gestures.

11. The system of claim 9, wherein the one or more hardware processors are further configured by the instructions to train the LSTM classification network, and wherein to train the LSTM classification network, the one or more hardware processors are further configured by the instructions to:
compute cross-entropy loss Li of ith training sample of the plurality of training sample RGB images by using following equation:

$Li{-}hj*\log(\sigma(s)j)$ where h is a 1×K vector denoting one-hot label of input comprising the plurality of training sample RGB images; and compute a mean of $L_i$ over the plurality of training sample images and propagating back in the LSTM network to fine tune the LSTM network in the training.

12. The system of claim 7, wherein upon classifying the 3D dynamic hand gesture into the at least one predefined gesture class, the one or more hardware processors are further configured by the instructions to communicate the classified at least one predefined gesture class to at least one of a device embodying the at least one RGB sensor and the wearable AR device, and to enable the device to trigger a pre-defined task.

13. A non-transitory computer-readable medium having embodied thereon a computer program for executing a method for hand-gesture recognition, the method comprising:
receiving, via one or more hardware processors, a plurality of frames of a media stream of a scene captured from a first person view (FPV) of a user using at least one RGB sensor communicably coupled to a wearable Augmented reality (AR) device, the media stream comprising RGB image data associated with the plurality of frames of the scene, the scene comprising a dynamic hand gesture performed by the user;
estimating, via the one or more hardware processors, a temporal information associated with the dynamic hand gesture from the RGB image data by using a deep learning model, the estimated temporal information being associated with hand poses of the user and comprising a plurality of key-points identified on user's hand in the plurality of frames, wherein the plurality of key-points comprises twenty one hand key-points, and wherein each key-point of the twenty one key points comprises four key points per finger and one key-point close to wrist of the user's hand, and wherein estimating the temporal information associated with the dynamic hand gesture comprises:
estimating, a plurality of network-implicit 3D articulation priors using the deep learning model, the plurality of network-implicit 3D articulation priors comprising a plurality of key-points determined from a plurality of training sample RGB images of user's hand; and
detecting, based on the plurality of network-implicit 3D articulation priors, the plurality of key-points on the user's hand in the plurality of frames; and
classifying, by using a multi-layered Long Short Term memory (LSTM) classification network, the dynamic hand gesture into at least one predefined gesture class based on the temporal information associated with the plurality of key points, via the one or more hardware processors.

* * * * *